April 4, 1939.  R. R. BROGDEN  2,153,296
MACHINE FOR TREATING EGGS
Filed March 21, 1936  6 Sheets-Sheet 1
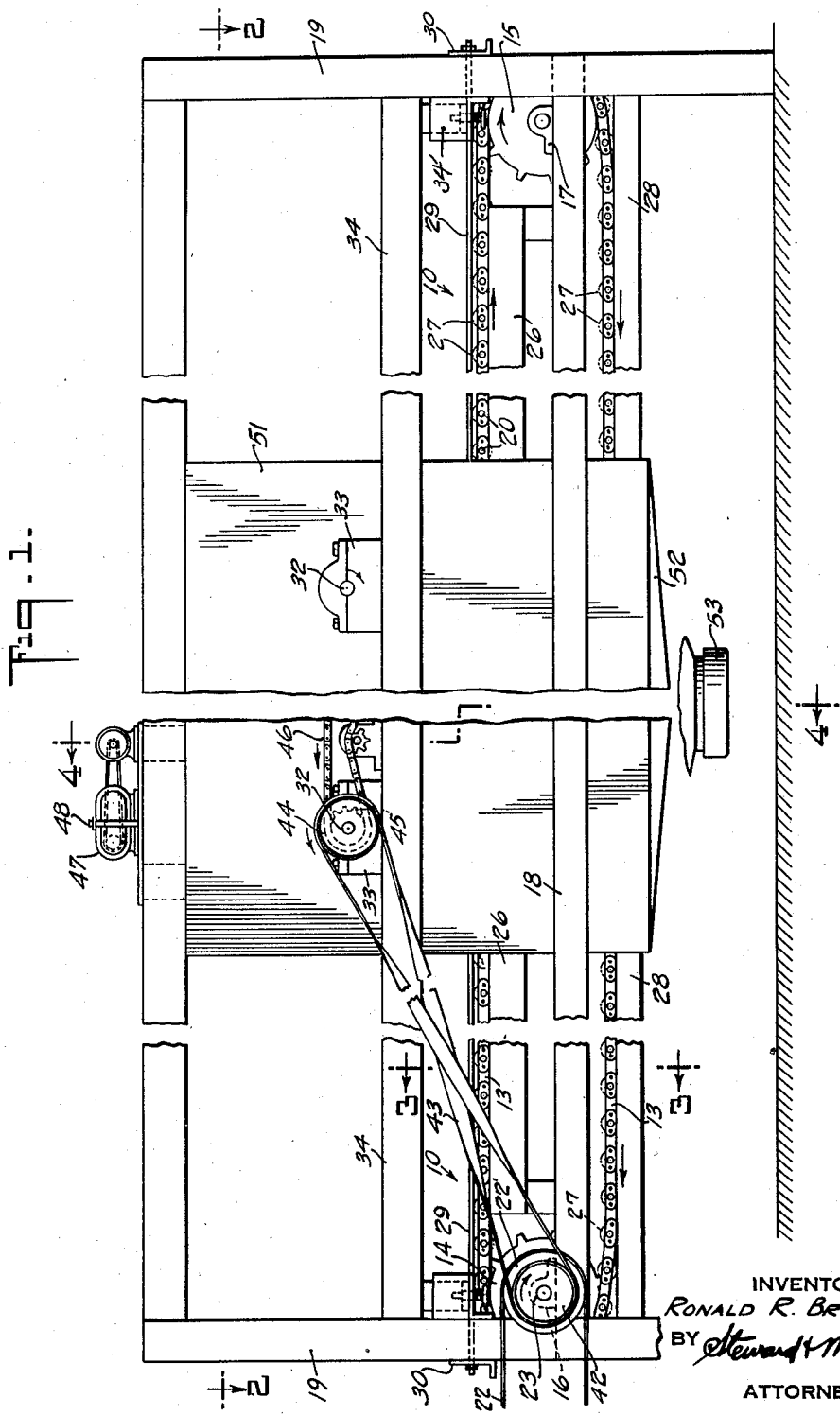
INVENTOR
RONALD R. BROGDEN,
BY
ATTORNEY

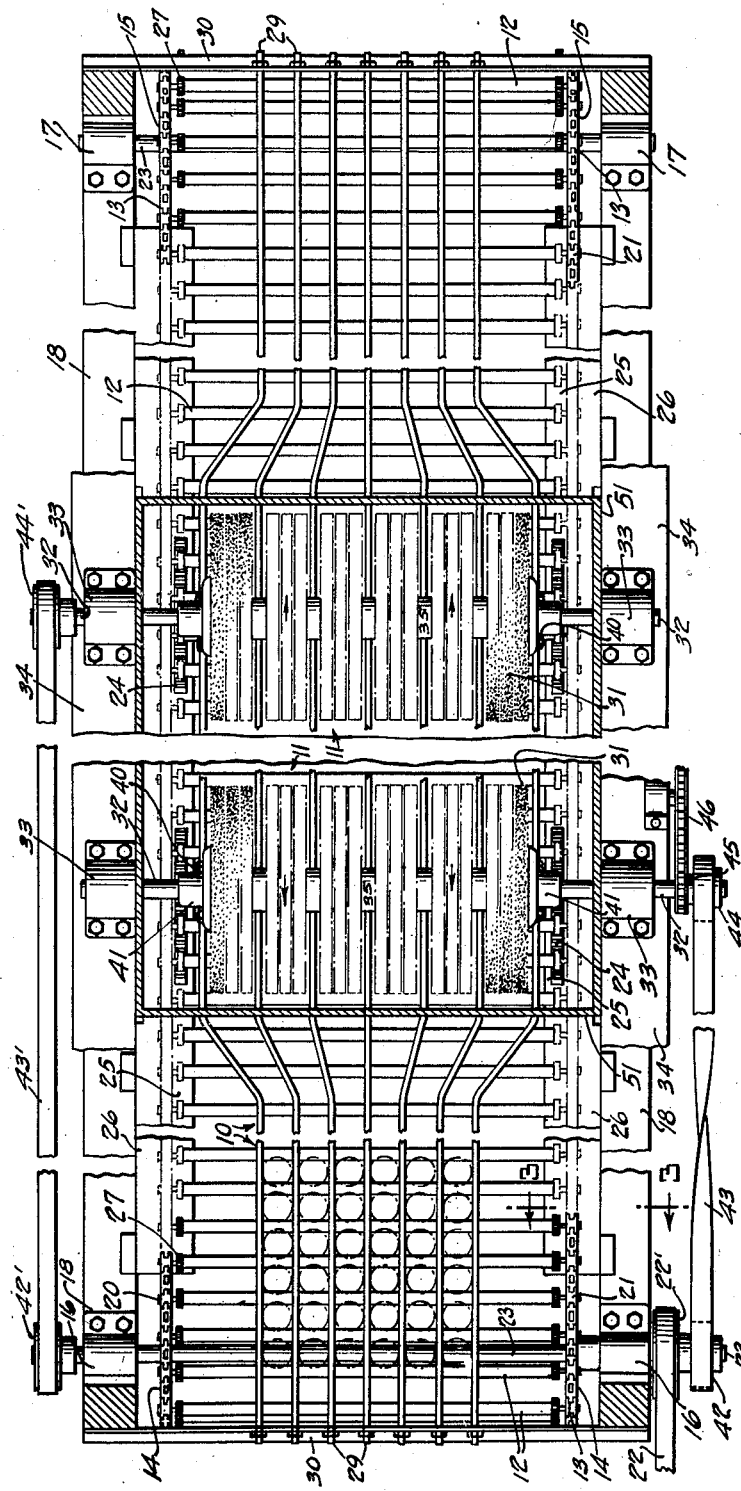

April 4, 1939.    R. R. BROGDEN    2,153,296
MACHINE FOR TREATING EGGS
Filed March 21, 1936    6 Sheets-Sheet 3

INVENTOR
RONALD R. BROGDEN,
BY
ATTORNEY

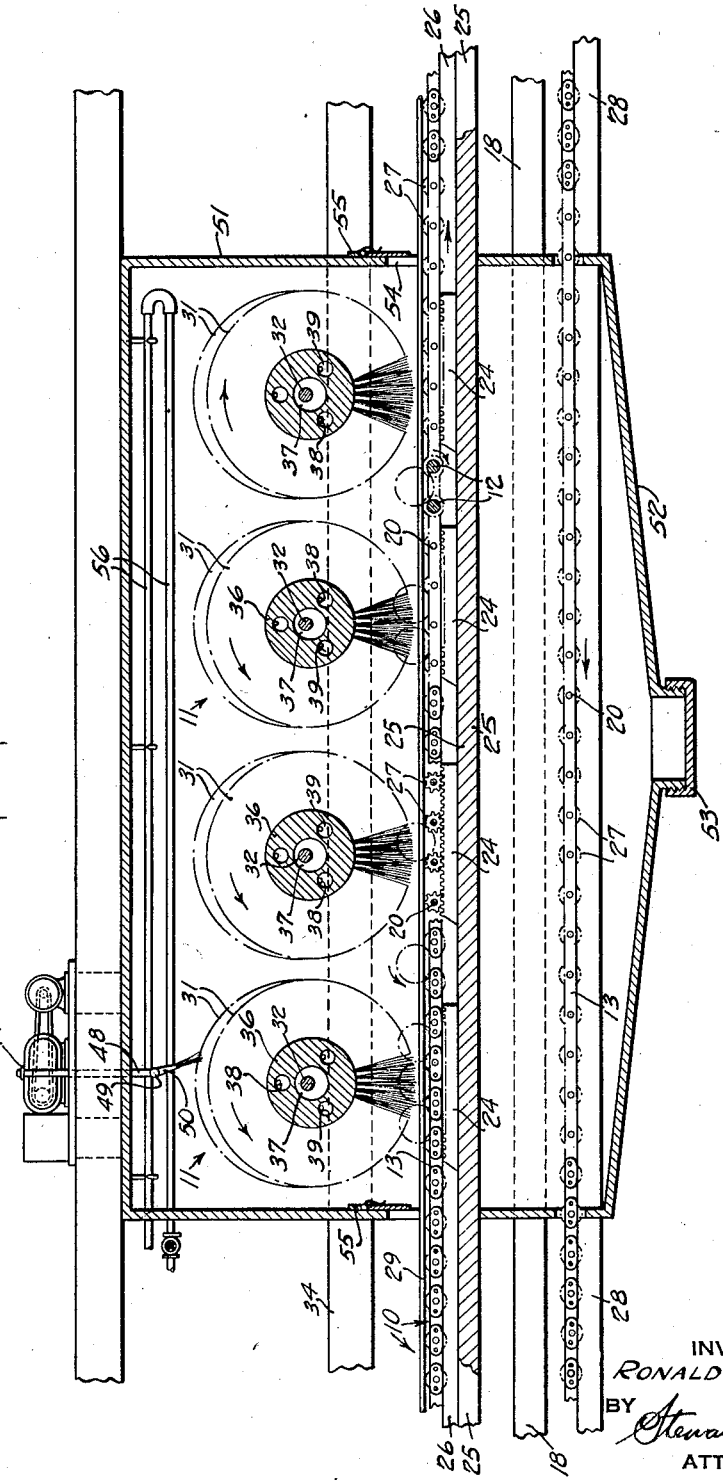

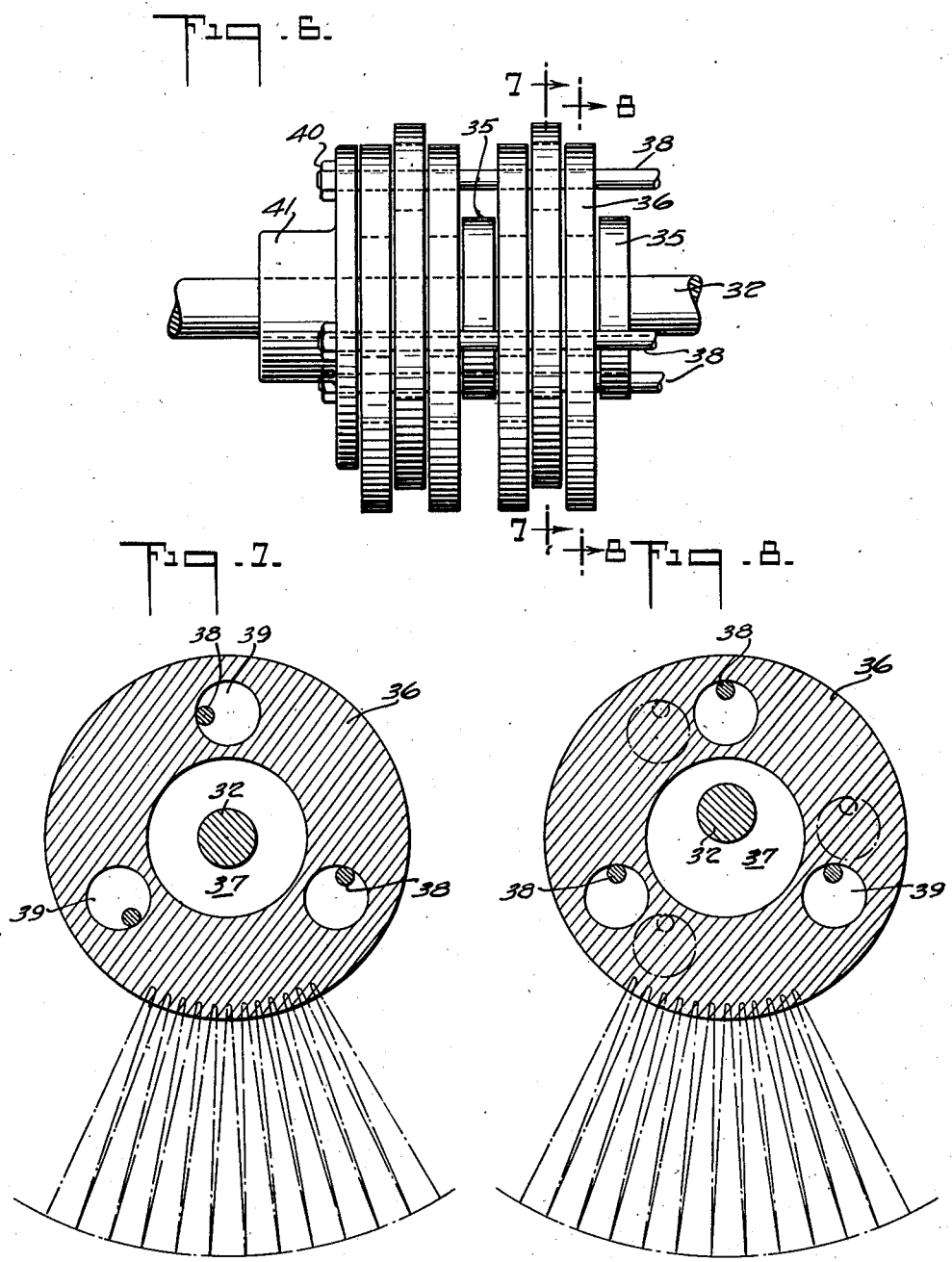

April 4, 1939.  R. R. BROGDEN  2,153,296
MACHINE FOR TREATING EGGS
Filed March 21, 1936  6 Sheets—Sheet 6

INVENTOR
RONALD R. BROGDEN.
BY
ATTORNEY

Patented Apr. 4, 1939

2,153,296

UNITED STATES PATENT OFFICE 2,153,296

MACHINE FOR TREATING EGGS

Ronald R. Brogden, Orlando, Fla., assignor to Brogdex Company, Winter Haven, Fla., a corporation of Florida Application March 21, 1936, Serial No. 70,129

30 Claims. (Cl. 91—39)

This invention relates to a machine for treating eggs; and it relates more particularly to a machine for effecting certain treatments of eggs involving a rubbing or brushing of these articles in preparation of the same for immediate marketing or for storage and subsequent marketing.

The machine of the invention is adapted for use simply in dry brushing eggs or in brushing them with water or other suitable liquid to clean them, or for applying thereto spreadable coating material, such as waxy material in fluent condition, for example, and brushing them to form from that material a uniformly thin or film-like preservative coating over each egg of the lot handled by the machine. It is more particularly designed and is especially useful for the last mentioned treatment.

A general object of the invention is to provide a machine capable of handling eggs in comparatively large quantities and automatically operating to perform the brushing and other operations thereon involved in their above-mentioned treatments rapidly, efficiently and in a manner tending to avoid breakage of the eggs.

Another object of the invention is to provide a machine having the foregoing capabilities of operation and which is also adapted to receive at least one layer of eggs in their customary paper board filler taken from a standard crate of eggs and which will, upon removal of the filler, automatically dispose the received unit quantity of eggs in an orderly arrangement best adapted for the brushing which the machine is designed to give them, and, preferably, will also finally restore the eggs to their arrangement as received so as to enable replacement of the filler thereover and removal from the machine of the treated eggs in their original unit quantity and assembled form in their filler as a layer of eggs for replacement of the same in the crate.

A further object of the invention is to provide a machine having means for disposing a lot of eggs in supported position and in an orderly arrangement of the eggs throughout the lot adapted for the brushing of each one of them, and separate brushing mechanism adapted in cooperation with such means to brush the eggs with substantially uniform brush pressure and intensity of the brushing action over all the surfaces of each egg throughout the lot.

In connection with the last-mentioned object of the invention, it may be pointed out that it is of decided advantage in the above-mentioned treatments of eggs, and especially in treating them with waxy material to form a preservative coating thereover, that throughout the lot undergoing treatment the eggs be brushed with substantially uniform brush pressure and friction or intensity of the brushing action. Also, eggs require a relatively light brush pressure and a compensating high speed of movement of the brush against them to render the brushing effective for any of the purposes hereinbefore mentioned and at the same time avoid cracking or breaking the eggs. Still further, while it is desirable that each individual egg of the lot partake of turning movements in contact with the brush in order that all parts of its surface may be brushed, it is important that the speed of turning movements of the egg be very considerably less than that high speed of movement of the brush against it mentioned above as required to render the brushing effective, in order to avoid agitating or breaking up the air cells in the eggs. That damage, if occurring, shows up in the candling of the eggs and usually renders them unacceptable to the trade.

In further consideration of the matters last mentioned above, it may be pointed out that a common type of egg brushing machine is one employing rotary brushes of the long cylindrical type arranged in parallel to cooperate in pairs to provide an egg runway supporting and advancing the eggs through the machine while brushing them. While machines of that general type brush the eggs with substantially uniform brush pressure and friction, due to the fact that the brush pressure and friction are determined by the weight of the eggs on the brushes and the speed of revolution of the brush surfaces, there is considerable bouncing of the eggs upon the brushes and a high degree of friction of the brushes on the eggs due to the relatively high peripheral speed of the brushes required to effectively brush the eggs, as pointed out above; and that bouncing and friction result in a considerable number of cracked or broken eggs. Also, with machines of that type, as in all egg brushing machines in which the brushes are relied upon to not only brush the eggs but to also impart turning movements thereto, the movements of the eggs are unavoidably so rapid as to more or less agitate or even break up the air cells within them.

Another common type of egg-brushing machine is one employing brushless egg supporting elements and an overhead brush engaging the eggs at a fixed level of its brush face. While some machines of this type do not rely upon the brush to turn the eggs on the support beneath it and therefore avoid the objection noted above as incident to high turning movements of the eggs, the brushes in these machines are, in general, of a construction and operating arrangement in relation to the egg-supporting means substantially varying the brush pressure on eggs of varying sizes or vertical dimensions on the support, which, as pointed out above, is not conducive to the best results from the brushing action and especially so in the brushing of eggs with waxy material applied thereto to form a preservative coating on the eggs.

Accordingly, a further and more particular object of the present invention is to provide a machine having egg supporting and conveying means and cooperating brush means avoiding the defects of prior machines of the general types mentioned above and satisfactorily meeting the more detailed requirements in the brushing of eggs also outlined above.

Considered in one of its broad aspects, the machine of my invention comprises a conveyor for supporting and advancing a rectilinear row of eggs in a predetermined path in line with the row, with the eggs disposed lengthwise in horizontal position in the row, and a rotary brush roll disposed in horizontal position over the conveyor with its lower side extending into the path of advance of the eggs and with that brush roll formed and mounted for movement from a limiting low position upward to varying extents, substantially against its own weight alone, by upward pressure, against its lower side, of advancing eggs on the conveyor. The mounting of the brush roll is preferably such as to dispose that roll, in its limiting low position, with substantially its full weight upon an egg of minimum size, i. e., vertical extent on the conveyor, which the machine is designed to handle, when such an egg is advanced by the conveyor beneath the brush. The brush pressure on the eggs is, therefore, substantially uniform, regardless of individual variations in egg sizes, for that pressure is determined substantially by the weight of the brush alone.

Means are provided for slowly rotating the eggs individually on the conveyor while in contact with the brush roll. Also the brush roll is preferably made of substantially lighter weight than required for its upward movement by and support on the eggs engaging its lower run; and at the high peripheral speed of the brush surface against the eggs permissible with such a brush, the eggs are effectively brushed but with such lightness and delicacy of stroke of the brush thereon as to avoid any substantial possibility of damage to the eggs.

Further, in the best practice of the invention, the foregoing advantageous characteristics of the rotary brush are enhanced by forming it of a plurality of relatively short annular sections or rolls disposed in succession lengthwise thereof and along a common driving shaft to form the brush as a whole or unit, and with these section rolls mounted on that shaft for upward yielding movement of each section roll independently of the others after the manner of the upward yielding movement of the brush roll as first described above. Such a sectional construction of the overhead rotary brush presents the further advantage of enabling the brush as a whole to substantially conform to the contours of the upper runs of the eggs engaged thereby.

The objects, principles and advantages of the invention will more fully appear from the concrete embodiment thereof in a machine for treating eggs to form over each individual egg a preservative coating of waxy material which is hereinafter described and shown in the accompanying drawings. That embodiment is not to be taken as restrictive, however, but is to be taken as merely illustrating the structural and operating principles of the invention, the invention being of the broad scope hereinbefore indicated and as defined in the appended claims.

Referring to the accompanying drawings forming a part of this specification,

Fig. 1 is a side elevational view of an egg treating machine embodying the invention, with parts broken away in the length of the machine to shorten the view;

Fig. 2 is a transverse sectional view of the machine taken on the line 2—2 of Fig. 1;

Fig. 3 is a sectional view of one lower side portion of the machine taken on the line 3—3 of Figs. 1 and 2;

Fig. 4 is a vertical transverse sectional view of the machine taken on the line 4—4 of Fig. 1;

Fig. 5 is a vertical sectional view taken on the line 5—5 of Fig. 4 longitudinally of the machine with the opposite end portions broken away;

Fig. 6 is a partial side elevational view, on a larger scale than that of the preceding views, of one of the overhead sectional brush units employed in the machine, but with the brush bristles omitted so as to show the solid body portions or cores of the section rolls;

Fig. 7 is a transverse sectional view, taken on the line 7—7 of Fig. 6, through one of the section rolls of the brush unit;

Fig. 8 is a similar sectional view of one of the section rolls on the line 8—8 of Fig. 6 showing the roll in a vertical position with respect to its driving shaft differing from the position of the roll shown in Fig. 5;

Figure 9:
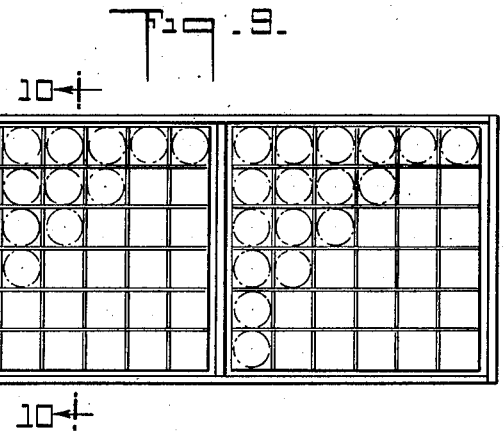
Fig. 9 is a more or less diagrammatic representation, in top plan view, of a crate of eggs of standard size and arrangement of the eggs in layers in their customary paper board fillers.

The illustrative machine may be generally described as comprising an egg-receiving zone, an egg-brushing zone, and an egg-delivery zone extending in succession through the machine longitudinally thereof, a conveyor and associated egg-positioning means extending through those zones and overhead rotary brushes of the general character already described in the brushing zone. The conveyor and associated egg-positioning means are formed to enable the deposition on the conveyor in the receiving zone of a layer of eggs in their customary paper board filler taken from a standard crate of eggs and, when such a layer of eggs in their filler is deposited on the conveyor and the filler removed, to automatically re-position the eggs on the conveyor in an arrangement adapted for the brushing of each egg of the lot, advance them in that arrangement from the receiving zone through the brushing zone into the egg-delivery zone and there restore the eggs to their positions relative to one another in the assembled group or layer as they were received on the conveyor so as to enable replacement of the filler over the eggs of the group and their removal as a layer of eggs in that filler for replacement of the same in the crate. The egg-receiving zone extends from the rear or intake end of the machine, at the left in Figs. 1 and 2, to the rear end wall of the housing 51. That housing encloses and defines the extent of the egg-brushing zone, and the egg-delivery zone extends through the remaining portion of the machine to its opposite or delivery end. The conveyor and associated egg-positioning means are indicated generally at 10 and the overhead brush rolls at 11, in Figs. 1, 2 and 5.

Referring now to the illustrative machine more in detail, the conveyor is of the endless roller-belt type having a horizontal upper run extending through the egg-receiving, brushing and delivery zones longitudinally of the machine, with the egg-supporting and conveying elements of that run traveling from the intake to the delivery end of the machine, as shown more particularly in Figs. 1, 2 and 5. That conveyor comprises an endless series of brushless rolls 12 mounted at their opposite ends in the pair of side chains 13 in a manner disposing the rolls transversely of their line of travel, parallel to one another and spaced apart sufficiently to support an egg between each two adjacent rolls with the major axis of the egg in substantially horizontal position and in parallelism with the rolls and only a minor portion of the body of the egg extending below the crown of the rolls, as shown more particularly in Figs. 2 and 5. The side chains 13 are trained over two pairs of sprockets 14 and 15 adjacent opposite ends of the machine, and these sprockets have their shafts journaled in bearings 16 and 17 supported on side rails 18 of the framework of the machine, the supporting uprights of that framework being indicated at 19. Each roll of the conveyor is provided at its opposite ends with pins 20 journaled in bearing blocks 21 of the side chains 13, as shown more particularly in Figs. 3 and 4, to enable that rotation of the rolls on their own axes as they are carried along in the travel of the conveyor which will later be referred to in detail. The conveyor may be driven from the rotor of an electric motor or other suitable prime mover (not shown), through power belt 22 trained over pulley 22' on the sprocket shaft 23.

The details of construction and functioning of the overhead rotary brushes will later be more fully pointed out, but it may now be noted that they are of the sectional brush roll construction hereinbefore generally described, that each of these overhead sectional brushes as a whole or unit is disposed transversely of the conveyor in horizontal position, and that they extend in a series longitudinally of the conveyor, the machine here shown having four of these brush units in the series, as shown more particularly in Fig. 5.

The conveyor rolls are individually rotated but only through those portions of the upper run of the conveyor which are beneath the brushes so as to rotate each egg on the conveyor only while it is in contact with the brushes. Any suitable means may be employed for that purpose. In the present example such means comprises two opposite-side series of racks 24, with four racks in each series to correspond with the four overhead brush units, with the racks of the respective series mounted on inner flanges 25 extending longitudinally of the opposite side rails 26 of the framework of the machine, and with the racks in the respective series in end-spaced relation to present a pair of oppositely disposed racks directly beneath each overhead brush unit. The conveyor rolls are provided, at their opposite ends, with pinions 27 which engage the racks and thereby set those rolls in rotation on their own axes as they are carried bodily along under the brushes and in engagement with the racks in the upper run of the conveyor. Due to the location of the opposite-side series of racks in the brushing zone only of the machine and to the end spacing of the racks in each series, however, the conveyor rolls do not rotate in the travel of the conveyor until they reach the first brush unit of the series of such units and their rotation is discontinued throughout their travel from the zone of the brushing action of each overhead brush unit to that of the next of the series of such units. The series of racks 24 not only cause rotation of the conveyor rolls beneath each brush unit of the series of such units but also serve to support the upper run of the conveyor at points between the sprockets which drive the conveyor chains. In this connection, it is to be noted that the bearing blocks 21 of the conveyor chains slidingly engage the upper surfaces of the side rails 26 outwardly of the flanges 25 to further support the upper run of the conveyor, as shown more particularly in Fig. 3. The lower run of the conveyor may also be supported at points intermediate the sprockets by any suitable means, such, for example, as lower side rails 28 in the framework of the machine which present upper longitudinally extending surfaces adapted to be sliding engaged by the bearing blocks 21 of the conveyor chains.

In the illustrative machine, the egg-positioning means comprises a plurality of rods 29, seven in number in the present example, each of circular cross-section and of substantially less diameter than the conveyor rolls, mounted at their ends in transverse bars 30 between the end uprights 19 of the machine to extend longitudinally of the conveyor over the entire length of its upper run, with these rods spaced only a sufficient distance above the crowns of the conveyor rolls across which they extend to clear those rolls. These rods extend in parallel from the rear or intake end of the machine (the left-hand end in Fig. 2) through the egg-receiving zone up to a short distance from the end of that zone at a spacing apart, over the width of the conveyor and hence longitudinally of the conveyor rolls, from center to center of the rods equal to the spacing apart of the centers of the conveyor rolls. From that point these rods diverge to a wider spacing and extend in parallel at that spacing entirely through the egg-brushing zone, and then they converge to the first-mentioned spacing in the region of their entrance to the egg-delivery zone and continue in parallel at the narrower spacing through the delivery zone to the front or delivery end of the machine.

Taking the diameter of the conveyor rolls into account, the spacing of those rolls apart from center to center is such as to enable any two adjacent rolls in the upper run of the conveyor to support an egg between them whether the egg be disposed end up or in horizontal position with its major axis parallel with the rolls. While the egg-positioning elements or rods 29 are of like spacing apart from center to center in their extension within the egg-receiving zone, because of their relatively small diameters and disposition above and cross the conveyor rolls they enable the disposal of eggs between each two adjacent rods upon the conveyor rolls but only in upright position of the eggs and these rods maintain the eggs in that position during their advance by the conveyor within the egg-receiving zone until the region of the divergence of the rods is reached. In that region the rods diverge to a spacing accommodating the eggs in horizontal positions on the conveyor rolls with their major axes substantially parallel with those rolls, and as the conveyor continues the advance of the eggs the latter assume those horizontal positions on the conveyor rolls and remain therein during their further advance through the brushing zone. It is to be noted that when the eggs are in their horizontal positions on the conveyor rolls just referred to, each two adjacent rods 29 extend along and closely adjacent the opposite end portions of each egg between them at a level below its center (see Figs. 4 and 5), and, when the egg reaches the region of convergence of the rods at the entrance end of the delivery zone the converging rods so engage its opposite end portions as to bring it to the upright position again with its smaller end up, and the rods maintain the eggs in that position as the conveyor advances them fully into the delivery zone of the machine.

Figure 10:
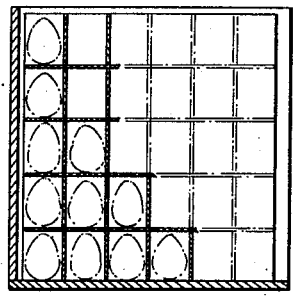
Fig. 10 is a transverse sectional view through the crate of eggs on the line 10—10 of Fig. 9, with one side of the crate taken off for removal of the eggs.

A standard crate of eggs contains thirty dozen eggs disposed five layers deep on each of the opposite sides of a center partition of the crate, with each layer separated from the one beneath it by a paper board liner and with each layer consisting of three dozen eggs in a paper board filler. That filler is of open framework construction divided into thirty six square frames, seen in plan view, forming a separate open ended cell for each egg of the layer and in which the egg is disposed in upright position with its smaller end up and its larger end supported on the paper board liner beneath the layer, all as more or less diagrammatically represented in Figs. 9 and 10. It is to be noted from Fig. 2 of the drawings that, with the conveyor at rest, the conveyor rolls 12 and the rods 29 of the illustrative machine also constitute an open framework in the receiving zone of the machine divided into at least thirty six square frames, in plan view, for the disposal of an egg in each frame in the same upright position with its larger end supported on the conveyor rolls. Thus, the arrangement presented by the conveyor rolls 12 and rods 29 in the egg-receiving zone of the machine enables the disposal on the conveyor in that zone of the unit quantity of thirty-six eggs contained in any one layer of a standard crate of eggs with the eggs in the group formation and in their upright positions in the group characterizing their arrangement in the layer of the crate. Also, as the upper run of the conveyor and the rods 29 are of the same extent and the rods 29 are in the same relation to each other and to the conveyor rolls in the delivery zone as in the receiving zone of the machine, the eggs of that unit quantity may be advanced, in the manner already described, from the receiving zone fully into the delivery zone where those eggs will be disposed on the conveyor rolls in the same group formation and positions of the eggs therein characterizing their initial disposal on the conveyor in the receiving zone. As a matter of fact, the machine and the conveyor and egg-positioning elements or rods 29 therein may be made of such longitudinal dimensions, while retaining, of course, the same arrangement of conveyor rolls and rods as shown, as to enable the disposal at one time on the conveyor at its intake end of several multiples of the unit quantity of thirty-six eggs in the arrangement described above and advance those eggs so as to finally dispose them in the same arrangement on the conveyor at the delivery end of the machine. Preferably the machine is constructed to thus handle four times that multiple quantity or twelve dozen eggs.

Figure 11:
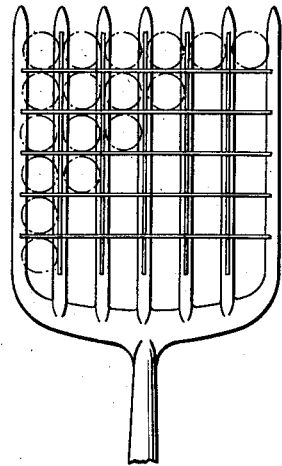
Fig. 11 is a top plan view and Fig. 12 is a side elevational view of a seven-pronged fork which may be employed in removing a layer of eggs in their filler from the crate and showing the eggs of a layer in their filler supported on the prongs of the fork.
Figure 12:
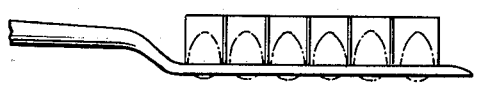
Figure 13:
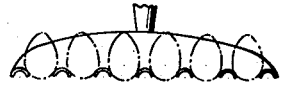
Fig. 13 is an end view of the seven-pronged fork which may be employed also in removing the treated eggs from the machine.

With the foregoing arrangement of the conveyor rolls and egg positioning elements or rods 29, a layer of eggs in their paper board filler taken from a standard crate of eggs is disposable on the rods in the receiving zone of the machine in position to cause the eggs to settle partly out of the filler through the very short distance required to dispose them in the described upright positions on the conveyor rolls without damage to the eggs. Any suitable means may be employed to remove the layer of eggs in their filler from the crate and thus dispose it on the egg-positioning rods in the receiving zone of the machine. The seven-pronged fork illustrated in Figs. 11, 12 and 13 is particularly adapted for this purpose. The prongs of that fork may be inserted beneath a topmost layer of eggs in the crate so as to dispose the unit quantity of thirty six eggs in their filler thereon, as shown in Figs. 11 and 12. With the conveyor at rest, the fork with its burden may then be deposited on the egg-positioning elements or rods 29 at the intake end of the machine and, as the fork is withdrawn, the filler assumes a supported position on the rods and the eggs settle in the frames presented by the rods and the conveyor rolls to supported positions on those rolls. The filler, which still encompasses the body portions of the eggs projecting above the rods 29, may then be lifted off, and the eggs will remain supported smaller end up on the conveyor rolls in an arrangement comprising six rectilinear rows of eggs extending longitudinally of the upper run of the conveyor, as shown in Fig. 2. The conveyor may then be set in operation and these rows of eggs will be advanced by the conveyor from the egg-receiving zone through the brushing zone to the delivery zone of the machine, with the egg-positioning elements or rods 29 functioning during that advance in the manner already described to change the position of each egg in each row from its upright position as received to horizontal position with the major axis of the egg in substantial parallelism with the conveyor rolls as the egg is advanced into the brushing zone, and to restore each egg to its original upright position on the conveyor rolls as it is advanced into the delivery zone. With the unit quantity of thirty-six eggs, for example, thus advanced to the delivery zone of the machine and the conveyor stopped, the eggs of that unit quantity present their original arrangement on the conveyor rolls, and the paper board filler may be lowered over the body portions of the eggs projecting above the rods 29 and the eggs removed from the delivery zone of the machine as a layer of eggs in that filler for replacement in the crate by any means adapted for such handling of the eggs. The seven-pronged fork already referred to may be used for that purpose. As shown in Figs. 12 and 13, its prongs are of a transverse curvature throughout the length of each of them adapting these prongs, in the horizontal position of use of the fork, to fit over the rods 29 in the delivery zone of the machine lengthwise of the prongs and rods to enable the fork to be slipped along the tops of the rods in a manner to dispose the layer of eggs in their filler upon the prongs of the fork, whereupon the layer of eggs in their filler may be removed from the machine and replaced in the crate by the fork.

In the illustrative machine, each of the overhead brush units comprises a plurality of brush sections 31, with each such section formed as a complete but relatively short brush roll, herein termed a section roll, and with these section rolls all of the same diameter and arranged in succession axially or lengthwise thereof and lengthwise of the common driving shaft 32 to form the brush unit. The driving shaft 32 of each brush unit is mounted for rotation in bearings 33 secured to the upper side rails 34 of the framework of the machine to dispose that shaft in substantially horizontal position at a predetermined level above the conveyor and across the path of travel of its upper egg-conveying run and hence parallel with the conveyor rolls. The machine is preferably provided with means for vertical adjustment of the bearings 33 and consequently of the level of the brush shafts 32 above the conveyor. Any suitable means may be employed for that purpose. In the illustrative machine, the side rails 34 are mounted at their opposite ends on vertically adjustable supporting devices, 34', attached to the end uprights 19 of the machine, these devices being of well known construction comprising slide-way brackets and screw-adjustable blocks therein to which the ends of the side rails 34 are anchored. Vertical adjustments of the blocks adjusts the level of the side rails 34 and consequently of the bearings 33 which are mounted thereon.

The section rolls of each brush unit may all be arranged end to end along the driving shaft 32 of the unit but, preferably, and as shown more particularly in Figs. 2 and 4, they are arranged in a plurality of groups, six in number in the present instance, with the groups equally spaced apart along the driving shaft, by spacer rings 35 on that shaft, to present a group of section rolls for each of the advancing rows of eggs on the conveyor. Each section roll of each group is shorter than the length of an egg of minimum size the machine is designed to handle and the section rolls of each group, three in number in the present instance, are arranged end to end to collectively span the length of each egg of the row advanced against them. Each section roll of each group is also preferably of a diameter extending its lower run into the path of advance of the eggs over an arc bringing it into brushing engagement with at least two adjacent eggs successively throughout the row advanced beneath it by the conveyor, and these section rolls are made of at least light enough weight to be supportable by the eggs engaging their lower runs in order to permit the upward yielding movements of these rolls by upward pressure of these eggs provided for by the mounting of the rolls next to be described.

Provision is made for coupling the section rolls of each brush unit to the driving shaft 32 of the unit in a manner mounting them as floating rolls and providing a driving connection from that shaft to the rolls for rotation of each roll in any vertical position it assumes. To that end the section rolls are each formed with a solid cylindrical or disc core 36 of wood or other suitable light weight material, centrally bored, as indicated at 37, on a diameter substantially greater than that of the shaft 32 for the extension of that shaft therethrough out of contact at all times with the cores of the rolls. The section rolls of each brush unit are coupled to the shaft 32 of the unit for the mounting and driving of the rolls by a plurality of identical coupling rods 38, three in number in the present example and of circular cross-section, which extend through eccentric bores or circular apertures 39, of diameters equal to each other and greater than those of the rods 38, in the disc core of each section roll. Each of the eccentric bores or circular apertures 39 of the disc core of each section roll extends therethrough in parallelism with the axis of the core, and these bores are so located as to space their longitudinal center lines equal distances from the axis of the core and equal distances apart circumferentially of the core. The coupling rods 38 are so mounted at their ends, by nut connections 40, on flanges 41 of the driving shaft 32 adjacent the opposite ends of the brush unit as to extend those rods in parallelism with the driving shaft 32 and to space their longitudinal center lines radially from the axis of that shaft and from each other circumferentially of that shaft in accordance with the spacing of the eccentric bores or apertures 39 in the disc cores of the section rolls about the axes of those cores.

With each brush unit of the series constructed and mounted as described above and as shown in the drawings, it is to be noted that the coupling rods 38, which are rigidly connected to the driving shaft 32 of the unit through the flanges 41 of that shaft, and the eccentric bores 39 in the disc cores of the section rolls through which those rods extend constitute a rod-and-socket coupling between that shaft and those rolls mounting the latter for rotation in unison with that shaft and for movement of each section roll independently of the others from a limiting low position thereof upward radially of that shaft by upward pressure, against its lower side, of advancing eggs on the conveyor substantially without other opposition than that afforded by the weight of the engaged section rolls. The maximum extent or range of the upward movement of the section rolls of each brush unit is determined, of course, by the diameters of the eccentric bores 39 in their disc cores relative to the diameters of the coupling rods 38 which extend through those bores. It is further to be noted that this rod-and-socket coupling between the driving shaft 32 and the section rolls of each brush unit is such as to drive each section roll on its own axis in any vertical position of that roll attained by upward pressure against its lower side of advancing eggs on the conveyor and to restrain the roll from any substantial movement radially of that shaft due to any centrifugal force developed in driving the roll from that shaft.

The limiting low position of each section roll of each brush unit relative to the driving shaft 32 of that unit is that of the roll shown in cross-section in Fig. 8, in which low position the roll is eccentric to that shaft. For the brushing pressure of the rotating roll not to exceed its normal desired value equal to the weight of the roll, the limiting high position is that represented in Fig. 7, in which limiting high position the roll substantially exactly centers itself with respect to the driving shaft 32, and each rod 38 is at the limit of its forward movement along the surface of bore 39. The use of the expressions forward movement and rearward movement in this connection refer to the direction of travel of the rod 38.

The shifting of each rod in its bore 39 from the position shown in Fig. 8 to that of Fig. 7 is due partly to the radial lifting pressure exerted by articles traveling beneath and engaged by the brush, and partly to the retarding force applied to the periphery of the roll by engagement with such articles. The retarding force, which is due partly to friction and partly to resistance of the brush bristles to bending, tends to move each bore 39 rearwardly with respect to the rod therein, and thus shifts the rod forwardly along the surface of the bore. This forward movement in the bore from the position of Fig. 8 tends to lift the roll and reduce the radial pressure on the article due to the roll weight. The relative importance of the retarding force and the radial lifting action exerted by the articles will vary under different conditions, and ordinarily the lifting force will be the principal factor.

When the roll is lifted above the position shown in Fig. 7, however, the rods 38 are forced to move rearwardly along the surfaces of the bores 39, thereby adding a downward component of force to the weight of the roll, and increasing the downward pressure on the articles to a progressively increasing extent. Since an important purpose of this invention is to minimize the downward pressure on the articles, shaft 32 should be located or adjusted, and bores 39 and rods 38 should be proportioned, so that the largest articles will not raise the brush roll above the position shown in Fig. 7, in which rods 38 are at the limit of their forward movement in bores 39. Each section roll of each brush unit is bodily supported on the coupling rods 38 throughout the rotary drive of that roll on its own axis in its limiting low position relative to the driving shaft 32 of the unit. This is shown by the full and dotted line presentations in Fig. 8 of the eccentric bores 39 in the core of the brush roll and of the coupling rods 38 therein as those bores take differing angular positions about the axis of the roll and those rods take correspondingly differing angular positions about the axis of the driving shaft 32 as the roll is driven from that shaft by the coupling rods in rotation of the roll on its own axis in its limiting low position. In this connection, it is to be noted that the coupling rods 38 constantly engage the core body of each section roll of the brush within the bores 39 at points equally spaced apart about the axis of the core to rotate the roll under pressure, against its lower side, of eggs on the conveyor, but the positions of these points of engagement change with respect to their radial distance from the axis of the roll as the roll moves upward and downward. For example, in the low position of a section roll, shown in Fig. 8, as well as in the high position shown in Fig. 7, the coupling rods 38 engage the core body of the roll within the eccentric bores 39 at points equally spaced apart about the axis of the roll. But, whereas a circle transcribed through these points of engagement is eccentric to the axis of the roll in the low position thereof shown in Fig. 8, it is concentric with that axis in the high position of the roll shown in Fig. 7. This is due, of course, to the fixed mounting of the coupling rods 38 on the driving shaft 32 of the brush unit which disposes those rods in a circular series concentric with that shaft, to the arrangement of the bores 39 in the core of each section roll in a circular series concentric with the axis of the roll and to the change in vertical position of the roll with respect to that shaft when the roll moves from its low to its high position.

It is further to be noted that in each brush unit the section rolls do not at any time engage the driving shaft 32. The driving shaft of each brush unit may therefore be formed as a divided or two-part shaft with the brush unit disposed between the parts so as to permit dispensing with the central bore 37 in the disc core 36 of each section roll and enable that core to be made solid except for the eccentric bores 39 through which the coupling rods 38 extend. Such a construction is advantageous where brush rolls of relatively small diameter are required or where the desired range of movement of the rolls radially of the driving shaft requires eccentric bores 39 in the cores of the rolls of substantially larger diameters relative to the diameters of the cores than indicated in the drawings for the present construction. On the other hand, where such requirements do not obtain, the present construction of the section rolls and their mounting in each brush unit is advantageous in avoiding the somewhat more complicated and heavier shaft mountings generally required to maintain the parts of a divided driving shaft in proper alignment. Either construction, however, presents rotary driving shaft means adjacent opposite ends of the brush unit, and the means for floatingly mounting and driving the section rolls of the unit from the shaft means will be as already described.

Each of the overhead brush units may be driven, through its shaft 32, from any suitable source of power, by any suitable transmission drive, and either in the direction of rotation of the conveyor rolls or in the opposite direction as may be found most advantageous in brushing the eggs on the conveyor beneath it. For reasons later to be mentioned, best results are generally secured, however, when the drive is arranged to rotate the first three brush units of the series in a direction opposite to that of the conveyor rolls and the last brush unit, at the delivery end of the brushing zone of the machine, in the direction of rotation of the conveyor rolls, and that is the general character of the driving arrangement employed in the illustrative machine. In the example given, the shafts 32 of the first three brush units of the series are driven from sprocket shaft 23 of the conveyor by pulley 42 on that shaft and crossed belt 43 extending therefrom to pulley 44 on the shaft 32 of the first brush unit of the series, i. e. the brush unit nearest the entrance end of the brushing zone of the machine, and the shafts 32 of the next two brush units of the series are driven by the sprocket and chain connection indicated at 45 and 46 in Fig. 1. The shaft 32 of the last brush unit of the series is driven from the sprocket shaft 23 of the conveyor by pulley 42' on that shaft and the straight belt 43' extending therefrom to pulley 44' on the shaft 32 of that brush unit, as shown more particularly in Fig. 2.

With the driving arrangements for the conveyor as a whole, the conveyor rolls, and the overhead brush units as described and shown, the conveyor rolls are rotated individually and all in the same direction in those portions of the upper run of the conveyor extending beneath the brush units, and the section rolls of the first three brush units of the series also have a single direction of rotation which, however, is opposite to that of the conveyor rolls. The conveyor rolls therefor rotate the eggs individually thereon in the direction of rotation of the section rolls of the first three brush units of the series of such units, but as the lower sides of these brush section rolls engage the upper surfaces of the eggs the peripheral movement of each brush surface against each egg is in a direction opposite to that of the engaged surface of the egg due to its rotation. The result is a very effective brushing action of these brush rolls on the eggs enabling the brush rolls of the last brush unit of the series to satisfactorily complete the brushing operation notwithstanding the fact that the brush surfaces of their lower sides engage the upper runs of the eggs in a direction of peripheral movement the same as that of the engaged surfaces of the eggs due to their rotation by the conveyor rolls. As stated above, the last brush unit of the series may be driven in the direction of rotation of the preceding brush units, but that direction of rotation, as indicated by the arrows in Fig. 5, is such as to cause the lower sides of the brush rolls to sweep across the upper runs of the eggs in the direction of advance of the eggs, and it has been found that when the last brush unit of the series is thus driven, the brush rolls of that unit have some tendency to impel the eggs forwardly on the conveyor from the brushing zone into the delivery zone of the machine. That tendency is avoided, and without appreciable loss in efficiency of the brushing operation on the eggs, by the provision made for driving the last brush unit of the series in a direction of rotation opposite to that of the preceding brush units; for with the last brush unit thus driven, the brush surfaces of its lower side sweep across the upper runs of the eggs in a direction opposite to that of the advance of the eggs, and the conveyor then functions alone to advance the eggs from the brushing zone into the delivery zone of the machine.

In connection with the operating features of the machine last mentioned above, it is also particularly to be noted that the entire arrangement of parts effecting the driving of the conveyor as a whole, the rotation of the conveyor rolls and the rotation of the brush rolls of each overhead brush unit of the series is such as to give these brush rolls a relatively high and uniform rotational speed, the conveyor a relatively slow travel and the conveyor rolls a like slow rotational speed so as to impart to the brush rolls a substantially higher peripheral speed than that of the eggs on the conveyor. The result is a very effective brushing of the eggs while at the same time their advancing and turning movements on the conveyor are so slow as to avoid agitating or breaking up the air cells of the eggs.

The conveyor and egg-positioning elements cooperate in the manner already described to present each egg of each of the rectilinear rows of eggs on the conveyor to the lower runs of the section rolls of the corresponding group of such rolls in each of the brush units with the egg disposed in horizontal position on the conveyor for brushing engagement of the section rolls therewith over the length of the egg. This brushing engagement of each of the six groups of section rolls of one brush unit with an egg in the corresponding row beneath it is shown in Fig. 4. It will be understood, of course, from what has previously been said about the extent of the lower side of each section roll along the path of travel of the eggs that the section rolls of each group in each brush unit extended into the just-described brushing engagement not with one egg only at a time but simultaneously with at least two adjacent eggs of the corresponding row, as shown in Fig. 5.

Preferably, the driving shaft 32 of each brush unit is mounted at such a level above the upper run of the conveyor as to dispose the two outer section rolls of each group of the unit in effective brushing engagement with an egg of the minimum size the machine is designed to handle when those rolls are approximately in their limiting low positions. Those rolls will, of course, then be moved upward by eggs of larger size advancing on the conveyor against their lower runs; and in all cases the middle section roll of the group will assume positions higher than those taken by the two outer rolls of the group, as shown in Fig. 4, for example, under upward pressure of eggs against its lower side for that section roll engages the higher parts of each egg at points along its length between the points of engagement of the outer section rolls of the group therewith. The extent of upward movement of the middle section roll of the group, as in the case of the outer rolls, will, of course, vary, within the predetermined limit or range of upward movement, in accordance with individual variations in the sizes of the eggs fed to the brushes. As hereinbefore pointed out, the upward yielding movement of each section roll under engagement of eggs on the conveyor therewith is substantially without other opposition than that afforded by the weight of the engaged rolls; and, of course, these rolls are supported in all but their limiting low positions by the eggs which move them upward. Upon such upward movement of the section rolls from their limiting low positions of support on the coupling 38, these rods engage the cores of these rolls within the bores 39 at points which, although not providing a support for the rolls on the rods, continue to provide a driving connection between the shaft 32 of the brush unit and the section rolls of the unit, as shown, for example, in Fig. 7 which shows a section roll in the high position and these points of engagement of the coupling rods with the core body of the roll within the eccentric bores.

In connection with the foregoing, it may be noted that while the arrangement of three coupling rods 38 for the driving connection between the shaft 32 and the section rolls of each brush unit is not indispensable for the satisfactory operation of the brush and any convenient number, more than two, of coupling rods 38 may be used, it has been found that the arrangement shown of three such rods, with the corresponding eccentric bores 39 in the disc cores of the rolls through which these rods extend, is particularly suitable as a well balanced arrangement. It will be also understood, of course, that the eccentric bores 39 in the cores of the section rolls and the coupling rods 38 which extend through them in each brush unit are of such relative diameters as to provide for a range of vertical movement of the section rolls radially of the driving shaft 32 of the unit amply covering the range of size variations from egg to egg usually occurring in any lot of eggs handled for market and also the range of variations in vertical dimensions on the conveyor of different body portions of the individual eggs along their length which the three section rolls of each group of such rolls in each brush unit are designed to engage. Also, the arrangement of the short section rolls of each brush unit in groups, one for each row of eggs on the conveyor, with the rolls of the group independently yieldable in upward direction as the eggs of the corresponding row are advanced and rotated on the conveyor against them, enables each brush unit to adapt itself to the contours of the upper runs of the eggs; and as the brush pressure on the eggs is determined substantially only by the weight of the brush rolls and they are all driven at the same constant speed, the result is a substantially uniform brushing action over the entire surface of each egg throughout the lot handled by the machine. Moreover, with the overhead brushes of the sectional construction and mounting here described and shown, the section rolls of these brushes may be made of substantially lighter weight than required for their upward yielding movement by and support on the eggs advanced by the conveyor against them, and this, together with the high rotational speed at which such overhead brushes may be driven in contact with the eggs, gives a brush stroke on the eggs effectively brushing them and yet of such lightness and delicacy as to avoid any substantial possibility of damage to the eggs.

As hereinbefore stated, while the illustrative machine may be used to carry out any one of several treatments of eggs involving brushing them, it is designed more particularly for the treatment of eggs with waxy material in a manner to form a thin film-like preservative coating of that material over each individual egg. To that end, the section rolls of each brush unit are provided with relatively long, soft and flexible bristles, such, for example, as bristles of fine horsehair having a length from the peripheral surface of the wooden core of the roll more than half the diameter of that core, as shown more particularly in Figs. 5, 7 and 8. Means are provided for applying waxy material, such as paraffin wax, for example, to eggs on the conveyor in the required amount so that the overhead brushes may function to spread the same uniformly over each egg of the lot. In the present example, that means takes the form of a wax atomizer or nebulizing unit, indicated generally at 47 in Figs. 1, 4 and 5, discharging the paraffin or other waxy material in fluent condition through the lead pipe 48, header 49 and nozzles 50 upon the upper runs of the section rolls of the first brush unit of the series, i. e. the unit adjacent the entrance end of the brushing zone of the machine. The atomizing or nebulizing unit 47 may be of any suitable type, such, for example, as that disclosed in the Skinner Patent No. 1,830,297, of November 3, 1931.

The brushing zone of the machine is enclosed by a housing 51, preferably having a hopper or pan-like bottom 52 with a removable closure cap 53 for collection and removal from time to time of such surplus coating material as may find its way below the brushes and settle. This housing has openings 54 in its opposite end walls, each provided with a flexible closure 55, through which eggs may pass, on the upper run of the conveyor, into the housing from the egg-receiving zone and from the housing to the egg-delivery zone of the machine. This housing is provided with steam coils 56, or other suitable heating means, to warm the atmosphere around the overhead brushes and the conveyor and eggs thereon to a sufficient degree above the melting point of the initial coating material to maintain it in fluent condition for the most effective application of that material to the eggs and the spreading of the same thereover.

In the operation of the machine, the section rolls of the first brush unit of the series, upon which the coating material is initially projected, function to transfer that material to and partially spread it over each egg engaging their lower runs. Some of the waxy material projected from the nozzles 50 will generally also reach the section rolls of the second brush unit of the series. However, the section rolls of the last brush unit or the last two brush units of the series will be sufficiently free from deposits of the coating material and sufficiently dry to complete the spreading of that material over the eggs. In this spreading operation the long and relatively soft and flexible bristles of the overhead brushes describe a rapid sweeping or dragging movement over practically the entire uppermost half portion of the body of each egg in close conformity with its surface contour which is very effective in spreading the coating material over the surface of the egg into the desired uniformly thin film coating without imparting a shine or polish to the eggs, which latter would be highly objectionable.

It will be seen that the illustrative machine handles the eggs with military order and precision. The eggs are presented to the machine in ranks and columns. The rank formation is maintained by the conveyor rolls so that all of the eggs of a rank are brushed simultaneously by the section rolls of a single brush roll unit, and the columnar formation is maintained by the longitudinally extending guide rods 29. The eggs as received are in close columnar formation and normal rank formation, the column and rank spacings being equal. The normal rank spacing is maintained throughout, but the eggs are deployed into open columnar formation for brushing so that they may rest on their sides during brushing. Finally, the coated and brushed eggs are turned on end and returned to the original close columnar formation for re-crating. This is all accomplished with the individual eggs under such positive and definite control that each is continuously protected from injury by its neighbors and all are uniformly brushed.

What is claimed is:

1. A machine for treating eggs comprising the combination, with conveyor means for supporting a rectilinear row of eggs and advancing the same, of means for guiding the advancing eggs rectilinearly in a predetermined path in line with the row, means for brushing the eggs of said row during their said advance comprising a rotary brush roll disposed above said conveyor means with its axis substantially horizontal and transverse to said path of advance of said eggs and its lower side extending into said path, said brush roll being formed and mounted for yielding movement upward from a limiting low position, substantially against its own weight alone, by upward pressure, against its lower side, of said advancing eggs, and means supplying fluent treating material to said brush roll for application of said material to said eggs by said roll.

2. A machine for treating eggs comprising the combination, with conveyor means for supporting a rectilinear row of eggs and advancing the same, of means for guiding the advancing eggs rectilinearly in a predetermined path in line with the row, means for applying fluent treating material to each of said eggs in succession throughout the row at a predetermined point in their advance, and means for brushing said eggs with said fluent treating material thereon comprising a rotary brush roll disposed above said conveyor means with its axis susbtantially horizontal and transverse to said path of advance of said eggs and its lower side extending into said path at points in advance of said point of application of fluent treating material to said eggs and with said brush roll formed and mounted for yielding movement upward from a limit-low position thereof, substantially against its own weight alone, by upward pressure, against its lower side of said advancing eggs.

3. A machine for treating eggs comprising the combination, with conveyor means for supporting a rectilinear row of eggs and advancing the same, of means for guiding the advancing eggs rectilinearly in a predetermined path in line with the row, means depositing spreadable coating material on each of said eggs of said row at a predetermined point in its advance, and means for spreading said deposited coating material over each of said eggs comprising a rotary brush roll disposed above said conveyor means with its axis substantially horizontal and transverse to said path of advance of said eggs and its lower side extending into said path at points in advance of said point of application of said material to said eggs and with said brush roll formed and mounted for yielding movement upward from a limiting low position thereof, substantially against its own weight alone, by upward pressure against its lower run of said advancing eggs.

4. A machine for treating eggs comprising the combination, with egg conveying and rotating means automatically operating to support a rectilinear row of eggs having each egg disposed therein with its major axis substantially horizontal and extending transversely of the row, to advance said row of eggs and to rotate the eggs individually and all in one direction on their said axes during their said advance, of means for guiding the eggs rectilinearly in a predetermined path in line with the row, means depositing spreadable coating material on each of said eggs of said row at predetermined points in its advance, and means for spreading said deposited coating material over each of said eggs comprising a rotary brush roll disposed above said egg conveying and rotating means with the axis of said brush roll substantially horizontal and transverse to said path of advance of said eggs and its lower side extending into said path, said brush roll formed and mounted for yielding movement upward from a limiting low position thereof, substantially against its own weight alone, by upward pressure, against its lower side, of said advancing eggs, and means for rotating said brush roll in all vertical positions thereof and in the direction of said rotation of said eggs.

5. A machine for treating eggs comprising the combination, with egg conveying and rotating means automatically operating to support a rectilinear row of eggs having each egg disposed therein with its major axis substantially horizontal and extending transversely of the row and to rotate said eggs individually and all in one direction on their said axes during their said advance, of means for guiding said row of advancing eggs in a predetermined path in line with the row, means for depositing spreadable coating material on each of said eggs of said row at a predetermined point in its said advance, and means for spreading said deposited coating material over each of said eggs comprising a rotary brush roll disposed above said egg conveying and rotating means with the axis of said brush roll substantially horizontal and transverse to said path of advance of said eggs and its lower side extending into said path, and means for rotating said brush roll in the direction of said rotation of said eggs, said roll having brush elements of such length and pliability as to individually flex over the upper curved surface portions of said eggs and effect sliding or dragging contact of said brush elements with said eggs tending to spread said coating material thereover without imparting any substantial polish to said eggs.

6. A machine for treating eggs as defined in claim 4 in which said egg conveying and rotating means comprises means for rotating said eggs at relatively low speed and said means for rotating said brush roll is operative to rotate said roll at relatively high speed.

7. A machine for treating eggs comprising the combination, with a rigid framework including supports, of a plurality of rotary brush rolls disposed in spaced relation longitudinally of the machine and having their axes substantially horizontal and extending transversely of the machine, shaft means mounted in said framework for rotating said rolls at relatively high speed and all in the same direction, egg conveying and rotating means mounted in said framework and automatically operating to support a rectilinear row of eggs having each egg disposed therein with its major axis substantially horizontal and extending transversely of the row, to advance said row of eggs longitudinally through the machine so as to bring each egg of said row into brushing engagement successively with the lower side of said brush rolls, and to rotate the eggs of said row individually on their said axes at relatively low speed and all in the direction of rotation of said brush rolls during the said engagements of said eggs with said rolls and to maintain said eggs without rotation throughout their advance from one brush roll to the next of said plurality of rolls, and means for guiding the advancing eggs of a row in a straight, predetermined path past the brush rolls.

8. A machine for treating eggs comprising the combination, with egg conveying and rotating means automatically operating to support a rectilinear row of eggs having each egg disposed therein with its major axis substantially horizontal and extending transversely of the row, to advance said row of eggs of means guiding said row of eggs and to rotate said eggs individually and all in one direction on their said axes during their said advance, in a predetermined path in line with the row a rotary brush roll disposed above said egg-conveying and rotating means with its axis substantially horizontal and extending transversely of the path of advance of said eggs and its lower side extending into said path, with said brush roll formed and mounted for yielding movement upward from a limiting low position thereof, substantially against its own weight alone, by upward pressure against its lower side of said advancing eggs, means for rotating said brush roll in all vertical positions thereof in the direction of rotation of said eggs, means for projecting coating material in fluent condition against the upper side of said roll for transfer by said roll of said coating material to each egg of said row engaging its lower side, and means for spreading said coating material over each of said eggs comprising a plurality of additional rotary brush rolls disposed to act on the eggs after the first mentioned brush roll and spaced apart along the path of advance of said eggs, with each of said additional brush rolls having the construction, mounting and means of rotation characterizing said first-mentioned brush roll.

9. A machine for treating eggs, comprising the combination, with means for supporting a rectilinear row of eggs having each egg disposed therein with its major axis in substantially horizontal position and extending transversely of the row, for advancing said row of eggs, and for guiding the row of eggs, for rotating said eggs individually and all in the same direction on their said axes during their said advance in a predetermined path in line with the row, of means for brushing the eggs of said row during their said advance comprising an overhead rotary brush unit disposed in horizontal position in the line of advance of said eggs and transversely of their path of travel and having a direction of rotation the same as that of said eggs, said brush unit comprising a plurality of separate sections with each of said sections formed as a complete brush roll shorter than the length of an egg of minimum size the machine is designed to handle, with said section rolls disposed end to end to collectively span each egg of said row over the length thereof as it is advanced into engagement with said brush unit, and with each of said section rolls formed and mounted for upward yield, independently of the others, by upward pressure, against its lower side, of said advancing eggs.

10. A machine for treating eggs as defined in claim 9 and having means supplying fluent treating material to the upper side of each of said section rolls of said brush unit for the brushing of said eggs with said material.

11. A machine for treating eggs as defined in claim 9 and having means operating to deposit spreadable coating material on each of said eggs of said row during their advance to said brush unit whereby said section rolls of said unit function to spread said deposited coating material over each of said eggs.

12. In a machine for treating eggs, the combination with a traveling conveyor for supporting and advancing eggs, of means for guiding the eggs in a row extending longitudinally of the path of travel of the conveyor, of means for brushing eggs when thus disposed on and advanced by said conveyor comprising a rotary brush roll disposed horizontally above said conveyor with its lower side extending into the path of advance of said eggs and with said brush roll of such weight as to be bodily supportable by eggs on said conveyor engaging its lower side, a rotary driving shaft for said brush roll having a mounting maintaining said shaft at a predetermined level above said conveyor, and means mounting said brush roll for rotation thereof in unison with said shaft and movement thereof radially of said shaft from a limiting low position of said roll upward to varying extents within a predetermined limit, substantially against its own weight alone, by upward pressure, against its lower side, of eggs of varying vertical dimensions disposed as aforesaid on said conveyor.

13. In a machine for treating eggs, the combination with a traveling conveyor adapted for the disposal in supported positions thereon of eggs in a row extending longitudinally of the path of travel of the conveyor, with the eggs equally spaced apart in the row and with each egg disposed lengthwise in substantially horizontal position and transversely of the row, and to advance said eggs in said row formation and positions of the eggs therein, of guiding means to maintain the eggs in row formation, means for brushing eggs when thus disposed on and advanced by said conveyor comprising a rotary brush roll disposed in the line of advance of said eggs in horizontal position above said conveyor and transversely of its path of travel, said brush roll having a brush face of such extent circumferentially of the roll as to extend its lower side into simultaneous engagement with at least two adjacent eggs successively throughout the row as said row of eggs is advanced by said conveyor through the zone of the brushing action and said brush roll being of such weight as to be supportable by eggs engaging its lower side, a rotary driving shaft for said brush roll having a mounting maintaining said shaft at a predetermined level above said conveyor and means mounting said brush roll for rotation thereof in unison with said shaft and for upward movement thereof radially of said shaft, by upward pressure of eggs on said conveyor against its lower side and substantially against the weight of said brush roll alone, to higher positions in which said roll is supported substantially by said eggs alone.

14. In a machine for treating eggs, the combination with a traveling conveyor adapted for the disposal in supported positions thereon of eggs in a row extending longitudinally of the path of travel of said conveyor, with each egg extending lengthwise in substantially horizontal position and transversely of the row, and to maintain and advance said eggs in said row formation and positions of the eggs therein, of means for brushing eggs when thus disposed on and advanced by said conveyor comprising a rotary shaft disposed in horizontal position at a predetermined level above said conveyor and transversely of its path of travel, and a brush comprising a plurality of separate annular sections surrounding said shaft, with each section of shorter length axially than the length of an egg of minimum size the machine is designed to handle and of such weight as to be bodily supportable by eggs on said conveyor engaging its lower side, with said sections disposed end to end to collectively span each egg of said row over the length of the egg as it is advanced by said conveyor beneath said brush and with said sections freely movable, each independently of the others, radially of said shaft by gravity from a limiting high position thereof concentric with said shaft to a limiting low position thereof eccentric to said shaft so as to adapt said brush sections to engage each egg on said conveyor at differing vertical positions of said sections, and means for transmitting rotary movement from said shaft to said sections of said brush in all vertical positions of said sections.

15. In a machine for treating eggs, the combination with a traveling conveyor adapted for the disposal in supported positions thereon of eggs in a row extending longitudinally of the path of travel of said conveyor, with each egg extending lengthwise in substantially horizontal position and transversely of the row, and to maintain and advance said eggs in said row formation and positions of the eggs therein, of means for brushing eggs when thus disposed on and advanced by said conveyor comprising a rotary sectional brush disposed in horizontal position above said conveyor and transversely of its path of travel and formed of a plurality of separate sections with each section constituting a complete brush roll shorter than the length of an egg of minimum size the machine is designed to handle, with said section rolls disposed end to end to collectively span each egg of said row over the length of the egg as it is advanced by said conveyor beneath said brush and with said section rolls collectively of such weight as to be bodily supportable by eggs on said conveyor engaging their lower sides, a rotary shaft for said brush disposed in horizontal position at a predetermined level above said conveyor, and means mounting said section rolls for rotation thereof in unison with said shaft and for movement thereof, each independently of the other and substantially against its own weight alone, from a limiting low position thereof upward radially of said shaft by upward pressure, against its lower side, of eggs advanced thereagainst by said conveyor.

16. A machine for treating eggs comprising the combination, with a traveling conveyor adapted for conveying eggs in a plurality of parallel rows extending longitudinally and spaced apart transversely of said conveyor, of means to maintain said eggs in separate rows as said conveyor advances said eggs, means for brushing the eggs of said rows during their said advance comprising a plurality of rotary brush rolls disposed in substantially horizontal position above said conveyor and in end-spaced relation transversely of the path of advance of said eggs to provide a brush roll for each of said rows of eggs, a common rotary driving shaft for said brush rolls and coupling means between said shaft and said brush rolls mounting the latter for rotation in unison with said driving shaft and for movement of each of said brush rolls independently of the others radially of said shaft from a limiting low position of said roll upward to varying extents within a predetermined limit by upward pressure, against its lower side of eggs of varying vertical dimensions disposed as aforesaid on and advanced by said conveyor into engagement with the lower side of said brush roll.

17. A machine for treating eggs as defined in claim 16 and in which each of said brush rolls is of a weight rendering it supportable by the eggs engaging its lower side and said coupling means so mounts each said brush roll as to provide for its said upward movement substantially without other opposition than that afforded by its own weight alone.

18. In a machine for treating eggs having an egg-receiving zone, an egg-brushing zone and an egg-delivery zone extending in succession through the machine, the combination with an endless conveyor having an egg-supporting and conveying run extending through said zones, of guiding means associated with said conveyor enabling the disposal on said conveyor in said egg-receiving zone of eggs in upright positions in a plurality of rows extending longitudinally and spaced apart transversely of said conveyor and automatically cooperating with said conveyor to maintain said eggs in said arrangement on said conveyor during their advance through said egg-receiving zone and then to spread the rows and position said eggs in each row with their major axes substantially horizontal and extending transversely of the row and maintain said eggs in said last-mentioned arrangement during their advance on said conveyor through said brushing zone, and brushing means comprising a plurality of brush rolls disposed in horizontal position above and spaced apart transversely of said conveyor in said brushing zone to provide a brush roll for each of said rows of eggs.

19. In a machine for treating eggs having an egg-receiving zone, an egg-brushing zone and an egg-delivery zone extending in succession through the machine, the combination with an endless conveyor having an egg-supporting and conveying run extending through said zones, of guiding means associated with said conveyor enabling the disposal on said conveyor in said egg-receiving zone of eggs in upright positions in a plurality of rows extending longitudinally and spaced apart transversely of said conveyor and automatically cooperating with said conveyor to maintain said eggs in said arrangement on said conveyor during their advance through said egg-receiving zone, then to spread the rows and position said eggs in each row with their major axes substantially horizontal and extending transversely of the row and maintain said eggs in said last-mentioned arrangement during their advance on said conveyor through said brushing zone, and finally to converge the rows and restore said eggs to their original upright positions in said rows as said conveyor advances them into said egg-delivery zone, and brushing means comprising a plurality of rotary brush rolls disposed in horizontal position above and spaced apart transversely of said conveyor in said brushing zone to provide a brush roll for each of said rows of eggs.

20. In a machine for treating eggs having an egg-receiving zone, an egg-brushing zone and an egg-delivery zone extending in succession through the machine longitudinally thereof, the combination which comprises egg guiding and conveying means extending through said zones longitudinally of the machine and enabling the deposition thereon in said egg-receiving zone of a unit quantity of eggs in the assembled form of a layer of eggs in the customary paper board filler taken from a standard crate of eggs and automatically operating when such a layer of eggs in their filler is deposited thereon to position said eggs and support the same independently of said filler in a plurality of rows extending longitudinally and spaced transversely of the machine with the eggs in the upright positions and distances apart characterizing their arrangement in said layer of the crate and, with said filler removed, to advance said eggs in said arrangement longitudinally of the machine in the egg-receiving zone thereof, then to spread the rows and position said eggs in each row with their major axes substantially horizontal and extending transversely of the row and advance said eggs in said last-mentioned arrangement longitudinally of the machine through the brushing zone thereof, and finally to converge the rows and restore said eggs to their original upright positions and spacings apart and advance them into said egg-delivery zone, said egg guiding and conveying means being formed and arranged to enable said filler to be placed over said eggs in said delivery zone of the machine and said eggs removed therefrom in the assembled form of a layer of eggs in said filler, and means for brushing said eggs during their advance through said brushing zone comprising a plurality of yieldingly mounted rotary brush rolls disposed in horizontal position above and spaced apart transversely of said advancing rows of eggs to provide a brush roll for each of said rows.

21. A machine for treating eggs comprising, in combination, a conveyor of the endless roller belt type having an upper horizontal run extending longitudinally of the machine from the intake to the discharge end thereof, said conveyor having transverse rolls disposed in parallel at an equal spacing apart enabling each two adjacent rolls in the upper run of said conveyor to support an egg between them with the egg in either upright position or in horizontal position with its major axis parallel with said rolls, a plurality of rods mounted in fixed positions at opposite ends of the machine and extending longitudinally over the upper run of said conveyor at a vertical spacing therefrom disposing said rods below the level of the centers of eggs when on said conveyor in said horizontal position, said rods extending in parallel from the intake end of said machine through a portion of their lengths at a spacing apart enabling the disposal between each two adjacent rods along their said extent of eggs on said conveyor rolls but only in upright positions of said eggs, said rods then diverging to a wider spacing accommodating eggs in said horizontal positions on said conveyor rolls and said rods extending in parallel at the wider spacing over a further portion of their length and said rods then converging to their first mentioned or narrower spacing and extending in parallel at said narrower spacing throughout the remaining portion of their length to the discharge end of the machine, and rotary brush rolls disposed in horizontal position above said rods in the region of their extent in parallel at said wider spacing to brush eggs when advancing in said horizontal positions on said conveyor between said rods.

22. In an egg-brushing machine, in combination, means for receiving and advancing eggs in rank and column formation, comprising a conveyor for advancing the eggs and maintaining the alinement of the ranks as the eggs advance, and guides for separating the columns and maintaining the columunar formation as the eggs advance, said guides being formed to spread the columns as the eggs advance and turn the eggs onto their sides and thereafter to re-converge the columns and turn the eggs upright to the original formation in which the eggs were received, all while preserving throughout the rank and column arrangement, and yieldingly mounted overhead brushing means for acting on the eggs while the columns are spread and the eggs are supported on their sides.

23. In an egg-brushing machine, the combination with means for advancing and guiding an egg in a straight path with its axis disposed transversely of the path, of an overhead brush composed of a series of independently yieldable sectional brushes arranged side by side and each urged downwardly solely by its own weight, to act jointly and simultaneously upon an egg, the outer sectional brushes of said series being symmetrically disposed with relation to the center line of said path.

24. Brushing apparatus comprising a brushing unit, means for supporting and rotating the unit, an associated conveyor traveling beneath the unit and means for guiding articles on the conveyor along a predetermined path into brushing engagement with the brushing unit, said unit comprising an axial series of brushing sections in register with said path, each section being separately yieldable upwardly when subjected to upward pressure by an article on the conveyor engaging said section.

25. Brushing apparatus comprising a brushing unit, means for supporting and rotating the unit, an associated conveyor traveling beneath the unit and means for guiding articles on the conveyor along a predetermined path into brushing engagement with the brushing unit, said unit comprising an axial series of brushing sections in register with said path, each section being separately yieldable upwardly when subjected to upward pressure not exceeding the weight of the section exerted by an article on the conveyor engaging said section.

26. Brushing apparatus comprising a brushing unit, means for supporting and rotating the unit, an associated conveyor traveling beneath the unit and means for guiding globular articles on the conveyor along a predetermined path into brushing engagement with the brushing unit, said unit comprising an axial series of three brushing sections forming a continuous brushing surface symmetrically arranged in alignment with said path, each section being separately yieldable upwardly when subjected to upward pressure exerted by a globular article on the conveyor engaging said sections.

27. Brushing apparatus comprising a brushing device including an axial series of separate brushing elements, means for supporting and rotating said device, a conveyor associated with and traveling beneath the device including means for conveying globular articles in axial rows and guide means for guiding said articles on the conveyor in transaxial rows into registered brushing engagement with said brushing elements.

28. Brushing apparatus as described in claim 27 in which the brushing elements are axially spaced from each other and the guide means maintain the transaxial rows of articles in correspondingly spaced position.

29. Brushing apparatus as described in claim 27 in which the guide means includes a receiving section arranged to receive articles in predetermined axially spaced position, an aligning section in which said articles are deflected laterally into alignment with the brushing units, and a brushing section extending beneath the brushing units and in alignment therewith.

30. Brushing apparatus comprising a brushing unit, means for supporting and rotating the unit, an associated conveyor traveling beneath the unit, and means for guiding articles on the conveyor along a predetermined path into brushing engagement with the brushing unit, said unit comprising a plurality of independently yieldable sections including sections positioned to brush the end portions of articles traveling along said path, and an intermediate section positioned to brush the central portion of an article in said path.

RONALD R. BROGDEN.